United States Patent Office 3,829,405
Patented Aug. 13, 1974

3,829,405
PHOSPHORUS-CONTAINING POLYESTERS
Stuart Lyle Cohen, Charlotte, N.C., and Robert William Stackman, Morristown, N.J.; said Cohen assignor to Fiber Industries, Inc., and said Stackman assignor to Celanese Corporation, New York, N.Y.
No Drawing. Continuation-in-part of application Ser. No. 51,019, June 29, 1970. This application June 22, 1971, Ser. No. 155,608
The portion of the term of the patent subsequent to Aug. 20, 1991, has been disclaimed
Int. Cl. C09k 3/28; D04h 11/00
U.S. Cl. 260—45.95 D                 7 Claims

ABSTRACT OF THE DISCLOSURE

Phosphorus-containing polyester compositions and shaped articles made therefrom having improved flame retardant properties wherein said polyester compositions comprise melt blends of a synthetic linear polyester with up to about 25 percent, based on the weight of polyester, of a polymer which is a poly(phosphonate-phosphate) copolymer having the following average general formula:

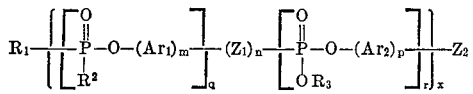

wherein $R_1$ is a monovalent radical having up to about 20 carbon atoms selected from the group consisting of alkoxy, aryloxy, hydroxy, haloalkoxy, haloaryloxy, hydroxyalkoxy, and hydroxy-aryloxy; $R_2$ is a monovalent radical having up to 20 carbon atoms selected from the group consisting of hydrogen, alkyl, aryl, haloalkyl, and haloaryl; $R_2$ is a monovalent radical having up to 20 carbon atoms selected from the group consisting of alkyl, aryl, haloalkyl and haloaryl; $Ar_1$ and $Ar_2$ are divalent radicals each having up to about 20 carbon atoms independently selected from the group consisting of arylene and haloarylene; $Z_1$ is a divalent radical selected from the group consisting of alkylene, arylene, haloalkylene, haloarylene, oxy, thio, and sulfonyl; $Z_2$ is either hydrogen or

$m$, $n$, and $p$ are integers which independently are either 0 or 1 and at least one of $m$ and $p$ is 1; $q$ and $r$ are integers of at least 1; $x$ is greater than 1. The most preferred polymer is the copolymer poly[($m$-phenylene phenylphosphonate)$_q$($m$-phenylene phenylphosphate)$_r$] where $q/r$ is greater than 3.

BACKGROUND OF THE INVENTION

This is a continuation-in-part application to application Ser. No. 51,019, filed June 29, 1970 (1970 Series).

This invention relates to synthetic linear polyester compositions containing phosphorus. More particularly, the invention relates to melt blends of synthetic linear polyesters with poly(phosphonate-phosphate) copolymers which impart flame retardant properties to said compositions.

As is well known, polyesters enjoy widespread commercial acceptance for the production of fibers and films. Of particular importance are poly(ethylene terephthalate) and poly(tetramethylene terepthalate). However, all polyesters are deficient in either their ability to resist ignition upon application of flame or their ability to self-extinguish. That is, the usual commercial polyesters are, to at least some extent, flammable. This characteristic makes commercial polyesters undesirable for the production of fibers and film which are employed in such end-uses as children's clothing and sleepwear, carpets, sheets, and draperies.

Although the prior art contains various examples of non-flammable polyester compositions, none have found commercial acceptance. Unfortunately, efforts to provide non-flammable polyester compositions have been successful only at the expense of fiber properties, such as tenacity, elongation, initial modulus, resilience, resistance to pilling, and color. The term "non-flammable" as used herein means the ability of a composition or shaped article or product made therefrom to self-extinguish, upon removal of the flame source, in air.

The applicant's copending application with Ser. No. 51,019 (1970 Series) describes how flame retardant polyester compositions are obtained by melt-blending up to about 25 percent of a polyphosphonate with a linear synthetic polyester, wherein said polyphosphonate may be represented by the following general formula:

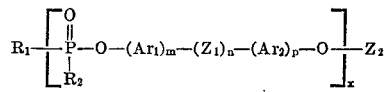

wherein $R_1$ is a monovalent radical having up to about 20 carbon atoms selected from the group consisting of alkoxy, aryloxy, hydroxy, haloalkoxy, haloaryloxy, hydroxyalkoxy, and hydroxy-aryloxy, and preferably is selected from the group consisting of aryloxy and hydroxyalkoxy; $R_2$ is a monovalent radical having up to about 20 carbon atoms selected from the group consisting of hydrogen, alkyl, aryl, haloalkyl, and haloaryl, and preferably is selected from the group consisting of alkyl and aryl; $Ar_1$ and $Ar_2$ are divalent radicals each having up to about 20 carbon atoms independently selected from the group consisting of arylene and haloarylene, and preferably are selected from the group consisting of phenylene and naphthylene; $Z_1$ is a divalent radical having up to about 20 carbon atoms selected from the group consisting of alkylene, arylene, haloalkylene, haloarylene, oxy, thio, and sulfonyl, and preferably is alkylene; $Z_2$ is either hydrogen or

$m$, $n$, and $p$ are integers which independently are either 0 or 1 and at least one of $m$ and $p$ is 1; $x$ is an integer which is greater than 1. The most preferred polyphosphonate is a poly($m$ - phenylene phenyl-phosphonate) wherein $R_1$ is phenoxy, $R_2$ is phenyl, $Ar_1$ is $m$-phenylene, $m$ is 1, $n$ and $p$ each are 0, and $Z_2$ is

The preferred range of polyphosphonate incorporation is from about 3 weight percent to about 15 weight percent.

However, the above preferred polyphosphonate, i.e. poly($m$ - phenylene phenylphosphonate) is an expensive additive which adds considerably to the cost of the finished article.

SUMMARY OF THE INVENTION

It is therefore an object of the present invention to provide phosphorus-containing polyester compositions which are flame retardant or non-flammable, and which are also economically acceptable.

In accordance with this invention the applicant has found that certain poly(phosphonate-phosphate) copolymers are eminently suitable for providing phosphorus-containing polyester compositions which are flame retardant or non-flammable. These copolymers are economically attractive compared to polyphosphonate homopolymers.

Copolymers of the following structure

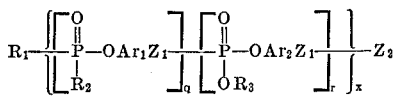

have been found to be useful for the preparation of flame retardant polyesters, wherein $R_1$ is a monovalent radical having up to about 20 carbon atoms selected from the group consisting of alkoxy, aryloxy, hydroxy, haloalkoxy, haloaryloxy, hydroxyalkoxy, and hydroxyaryloxy; $R_2$ is a monovalent radical $R_2$ is a monovalent radical having up to 20 carbon atoms and selected from the group consisting of hydrogen, alkyl, aryl, haloalkyl, and haloaryl; $R_3$ is a monovalent radical having up to 20 carbon atoms and selected from the group consisting of alkyl, aryl, haloalkyl and haloaryl; $Ar_1$ and $Ar_2$ are divalent radicals each having up to about 20 carbon atoms independently selected from the group consisting of arylene and haloarylene; $Z_1$ is a divalent radical selected from the group consisting of alkylene, arylene, haloalkylene, haloarylene, oxy, thio, and sulfonyl; $Z_2$ is either hydrogen or

$m$, $n$, and $p$ are integers which independently are either 0 or 1 and at least one of $m$ and $p$ is 1; $q$ and $r$ are integers of at least 1; $x$ is greater than 1. The most preferred polymer is the copolymer poly[($m$ - phenylene phenylphosphonate)$_q$($m$-phenylene phenylphosphate)$_r$] where $q/r$ is greater than 3.

DETAILED DESCRIPTION OF THE INVENTION

The poly(phosphonate-phosphate) copolymers of the present invention may be prepared by methods similar to those well known in the art. Such methods include the melt condensation of aromatic diols with four parts of phenyl phosphonic dichloride and one part of phenyldichlorophosphate (W. R. Sorenson and T. W. Campbell, "Preparative Methods of Polymer Chemistry," 2nd ed., Wiley Interscience, New York, 1968, pp. 145–6).

The copolymers as described hereinbefore have molecular weights varying within a wide range. Thus, the copolymers may range from oligomers (i.e., $x$ is in the range of from 2 to about 4) to polymers containing up to 100 or more repeat units (i.e., $x$ equal to 100 or more). When $R_3$ is aryl or haloaryl it is preferred that the value of $q/r$ be greater than 2, since at high levels of phosphate the polymer cross-links apparently due to exchange of the phenoxy side chain with resorcinol; and it is most preferred that the value of $q/r$ be greater than 3. However, when $R_3$ is alkyl or haloalkyl cross-linking is minimized and the preferred range of $q/r$ is ¼ to 4. Values of $q/r$ less than ¼ are undesirable since they tend to give a brown polymer, particularly at high concentrations of the copolymer additive. It is desirable that the copolymers have a degree of polymerization of at least about 3. The term "degree of polymerization" refers to the value of $x$ and eliminates the necessity of calculating molecular weight ranges for all copolymers encompassed by the general formula described hereinbefore. Thus, depending upon the copolymer and polyester employed, it may be desirable to utilize copolymers having a degree of polymerization from about 3 to about 10. However, it may be desirable on occasion to utilize copolymers having a degree of polymerization somewhat greater than 10, perhaps as high as about 100. Additionally, the copolymers with $R_3$ being aryl or haloaryl may be capped by the addition of minor amounts of an alcohol or phenol to the reaction mixture. This procedure minimizes phosphorus-chlorine bonds in the resultant copolymer which tend to discolor polyester. Further, the procedure serves as a means for controlling molecular weight or degree of polymerization of the copolymers.

Preferably, the copolymers of the present invention are prepared by the reaction of one part of phenyl dichlorophosphate and at least four parts of either methyl phosphonic dichloride or phenyl phosphonic dichloride with an aromatic diol such as resorcinol, hydroquinone, catechol, 4,4'-dihydroxy-biphenyl, 2,2-bis-(4-hydroxyphenyl)propane, and the like.

The term "synthetic linear polyester" as used herein comprehends as a class, polyesters prepared by the polycondensation of a dicarboxylic acid or its lower alkyl ester with a diol wherein said dicarboxylic acid and said diol independently may be aliphatic, cycloaliphatic, or aromatic. Preferably, said synthetic linear polyesters are prepared from terephthalic acid or its lower dialkyl ester and a polymethylene glycol having the general formula:

$$HO(CH_2)_vOH$$

where $v$ is an integer from 2 to about 8. The most preferred polyesters, poly(ethylene terephthalate) and poly(tetramethylene terephthalate), are obtained when $v$ is 2 and 4, respectively. By "lower alkyl ester" is meant an ester derived from an aliphatic alcohol having from 1 to about 6 carbon atoms. Film and fiber-forming polyesters are preferred, which may exhibit an intrinsic viscosity in o-chlorophenol at 25° C. of at least 0.40 deciliters per gram.

As stated hereinbefore, the flame retardant polyester compositions of the present invention are obtained by melt-blending up to 25 weight percent of a poly(phosphonate-phosphate) copolymer as defined hereinbefore with a synthetic linear polyester also as defined hereinbefore. The preferred range of copolymer incorporation is from about 3 weight percent to about 15 weight percent. The most preferred range is from 3 weight percent to about 10 weight percent. The term "melt-blending" as used herein refer to the physical mixing of the copolymer additive with the polyester while the latter is in a molten state. Thus, the copolymer may be added to the polymerization vessel either during or after polymerization of the polyester. Alternatively, the copolymer may be mixed or blended with polyester chip and the resultant mixture melted. Obviously, the melting step in the latter procedure may be a part of the extrusion operation which provides shaped articles from said flame retardant polyester composition.

The flame retardant polyester compositions of the present invention may be utilized for the production of flame retardant fibers and films by conventional methods. Such methods include melt-spinning to provide both staple and continuous filament fibers; melt-extruding to provide films; and the production of heterofilament yarns by melt-spinning techniques, wherein the orientation may be either sheath-core or side-by-side and either or both components may be the flame retardant polyester compositions of the present invention. The fibrous structures may be conventionally melt spun or prepared by the fibrillation of an oriented film. Mixed filament yarns such as a yarn comprising cellulose acetate filaments and polyester filaments modified in accordance with this invention are contemplated. Further, the flame retardant polyester compositions of the present invention may be utilized in the preparation of moldnig compositions in pellet or powder form, which compositions may also incorporate ingredients such as glass, china clay, talc, etc.

Fibers and filaments in either staple or continuous form may be utilized in the production of flame retardant fabrics. Such fabrics may be obtained by either nonwoven or conventional knitting or weaving techniques to give flame retardant carpets and flame retardant fabrics suitable for use in children's clothing and sleepwear, draperies, sheets, and the like. The preparation of carpets and fabrics may utilize fibers and filaments obtained only from the flame retardant polyester compositions of the present invention. Or, in the preparation of carpets and fabrics may utilize blends of the flame retardant fibers and filaments as described hereinbefore with conventional polyester or nylon fibers and filaments.

Without intending to limit it in any manner, the following examples will serve to illustrate the invention.

EXAMPLE I

Ninety parts by weight of poly(ethylene terephthalate) having an intrinsic viscosity of 0.6 deciliters/gram, determined as an 8% concentration in o-chlorophenol at 25° C., was conventionally mixed with 10 parts by weight of substantially poly[(m-phenylene phenylphosphonate)$_4$(m-phenylene phenylphosphate)] before being melt-blended in an extruder at 280° C. and cast into chip. The oxygen index of this product was found to be 19.5 as determined by the following test.

The oxygen index test is a relatively recent procedure for evaluating the flammability of polymeric materials. Various forms of the test are described in the literature, e.g., C. P. Fenimore and F. J. Martin, *Modern Plastics*, 43, 141 (1966). The procedure used here basically consisted of measuring the minimum percentage of oxygen in an oxygen-nitrogen atmosphere capable of sustaining a flame in a sample of film for any observable finite time after removal of an external flame. The sample of film is 10 mil thick, 2 inches long and ¼ inch broad and is held in the vertical position with the ¼ inch edges at top and bottom. The base of the film is ignited by a vertical micro-hydrogen-oxygen flame ⅟₁₆ inches long and ⅟₃₂ inches in diameter at a temperature of 1350° C. The flame is removed one second after ignition occurs. If a burn is unattainable the oxygen level is recorded and raised.

EXAMPLE II

As a control, Example I was repeated except that the poly[(m - phenylene phenylphosphonate)$_4$(m - phenylene phenylphosphate)] was omitted. The product was found to have an oxygen index of 17.0.

EXAMPLE III

Example I was repeated except that poly[(m-phenylene phenylphosphonate)$_9$(m - phenylene phenylphosphate)] was used instead of poly[(m-phenylene phenylphosphonate)$_4$(m-phenylene phenylphosphate)]. The product was found to have an oxygen index of 19.5.

EXAMPLE IV

The procedure of Example I was repeated except that poly[(m - phenylene phenylphosphonate)(m - phenylene methylphosphate)] was used instead of poly[(m-phenylene phenylphosphonate)$_4$(m-phenylene phenylphosphonate)]. The polymer was found to have an oxygen index of 19.8.

EXAMPLE V

The procedure of Example I was repeated except that poly[(m - phenylene phenylphosphonate)(m - phenylene ethylphosphate)] was used instead of poly[(m-phenylene phenylphosphonate)$_4$(m - phenylene phenylphosphate)]. The product was found to have an oxygen index of 20.1.

EXAMPLES VI–X

Similar improvements in oxygen index are obtained when poly(tetramethylene terephthalate) is used instead of poly(ethylene terephthalate).

Having thus disclosed the invention, what is claimed is:

1. Phosphorus-containing polyester compositions having improved flame retardant properties wherein said compositions comprise melt blends of a synthetic linear polyester with an effective amount up to 15 weight percent of a poly(phosphonate-phosphate) copolymer having the following average general formula:

$$R_1 - \left[ \left[ \begin{array}{c} O \\ \| \\ P - OAr_1Z_1 \\ | \\ R_2 \end{array} \right]_q \left[ \begin{array}{c} O \\ \| \\ P - OAr_2Z_1 \\ | \\ OR_3 \end{array} \right]_r \right]_x - Z_2$$

wherein $R_1$ is a monovalent radical having up to about 20 carbon atoms selected from the group consisting of alkoxy, aryloxy, hydroxy, haloalkoxy, haloaryloxy, hydroxyalkoxy, and hydroxyaryloxy; $R_2$ is a monovalent radical having up to 20 carbon atoms and is independently selected from the group consisting of hydrogen, alkyl, aryl, haloalkyl, and haloaryl; $R_3$ is a monovalent radical having up to 20 carbon atoms and is selected from the group consisting of alkyl, aryl, haloalkyl, and haloaryl; $Ar_1$ and $Ar_2$ are divalent radicals each having up to about 20 carbon atoms independently selected from the group consisting of arylene and haloarylene; $Z_1$ is a divalent radical selected from the group consisting of oxy and thio; $Z_2$ is either hydrogen or $$\begin{array}{c} O \\ \| \\ -P - R_1; \\ | \\ R_2 \end{array}$$

$q$ and $r$ are integers of at least 1; and $x$ is greater than one.

2. The phosphorus-containing polyester compositions of claim 1 wherein said synthetic linear polyester is poly(ethylene terephthalate) or poly(tetramethylene terephthalate).

3. The phosphorus-containing polyester compositions of claim 2 wherein said copolymer is selected from the group consisting of poly(m-phenylene phenylphosphonate)$_q$(m-phenylene phenylphosphate)$_r$], and poly[(m-phenylene phenylphosphonate)$_q$(m - phenylene methylphosphate)$_r$], and poly[(m-phenylene phenylphosphonate)$_q$(m-phenylene ethylphosphate)$_r$].

4. The compositions of claim 3 wherein the concentration of said copolymer is from 3 to 10 percent.

5. A fiber comprising the polyester compositions of claim 1.

6. A tufted carpet having a pile construction comprising the polyester fiber of claim 5.

7. A film comprising the polyester compositions of claim 1.

References Cited

UNITED STATES PATENTS

| | | | |
|---|---|---|---|
| 2,743,258 | 4/1956 | Coover, Jr. | 260—47 |
| 2,891,915 | 6/1959 | McCormack et al. | 260—2 |
| 2,926,145 | 2/1960 | McConnell et al. | 260—2 |
| 3,624,024 | 11/1971 | Caldwell et al. | 260—40 |
| 3,629,365 | 12/1971 | Gardner | 260—857 |
| 2,435,252 | 2/1948 | Toy | 260—47 |
| 2,968,639 | 1/1961 | Caldwell et al. | 260—33.8 |
| 3,027,349 | 3/1962 | Bahr et al. | 260—45.7 |
| 3,169,925 | 2/1965 | Mahoney | 252—49.8 |
| 3,293,105 | 12/1966 | Koller | 161—67 |
| 3,356,631 | 12/1967 | Jackson, Jr. et al. | 260—31.2 |
| 3,406,224 | 10/1968 | McDonough | 260—860 |
| 3,535,300 | 10/1970 | Gable | 260—29.1 |

OTHER REFERENCES

Kosolapoff: "Organophosphorus Compounds," 1950, pp. 241 and 243.

DONALD E. CZAJA, Primary Examiner

R. A. WHITE, Assistant Examiner

U.S. Cl. X.R.

161—67; 260—45.7 P,75 P, 860